H. C. WILLIAMS.
PEANUT HARVESTER.
APPLICATION FILED AUG. 9, 1916.
1,267,614.
Patented May 28, 1918.
3 SHEETS—SHEET 1.
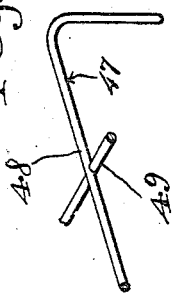
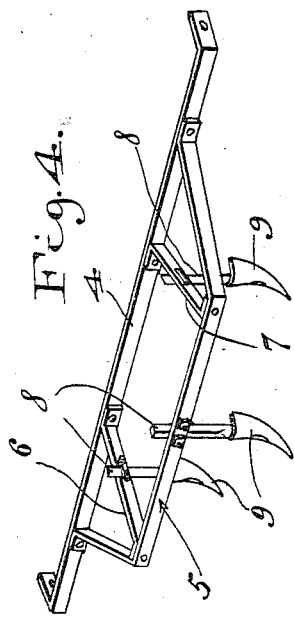
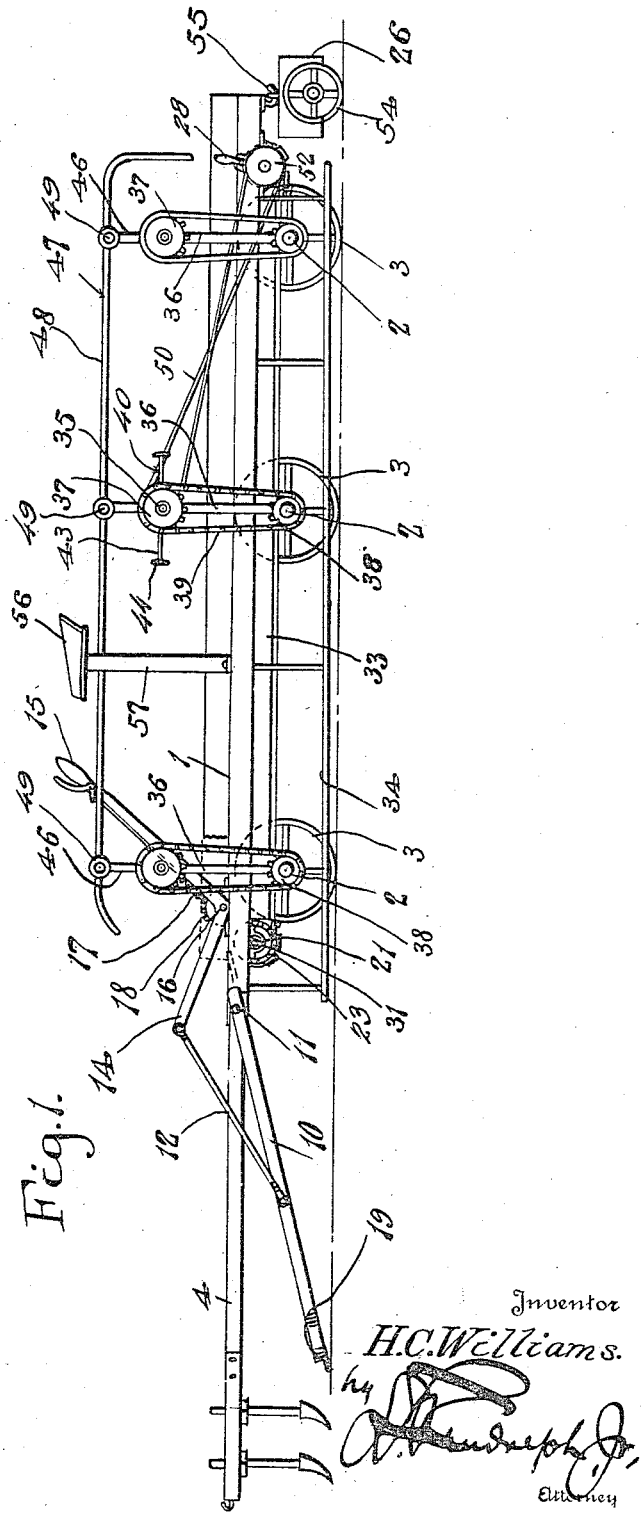
Witness
Inventor
H. C. Williams.

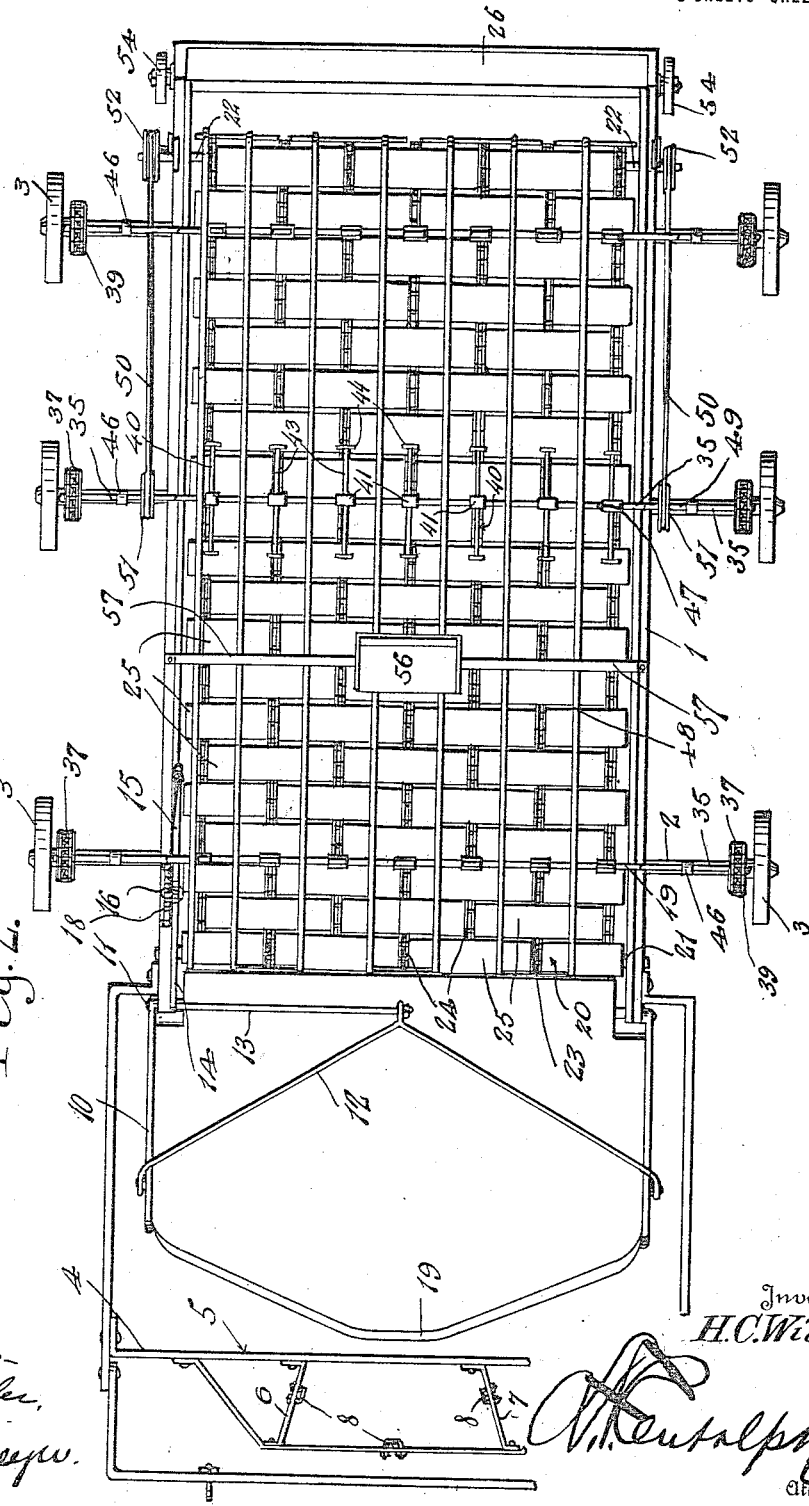

H. C. WILLIAMS.
PEANUT HARVESTER.
APPLICATION FILED AUG. 9, 1916.
1,267,614.
Patented May 28, 1918.
3 SHEETS—SHEET 3.
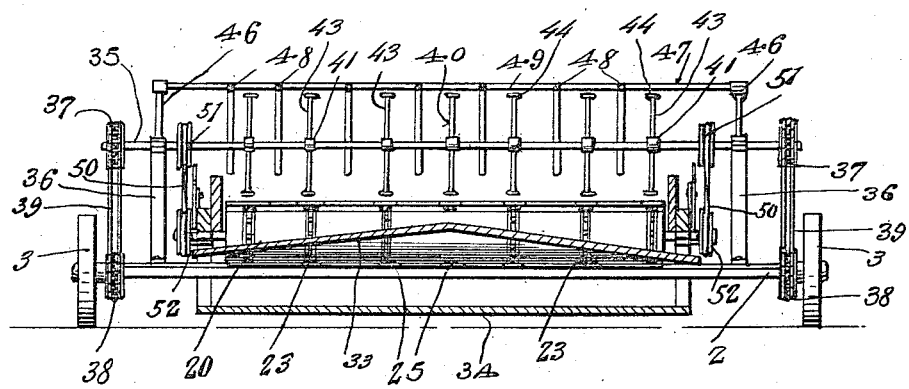
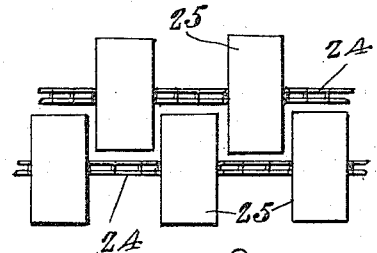
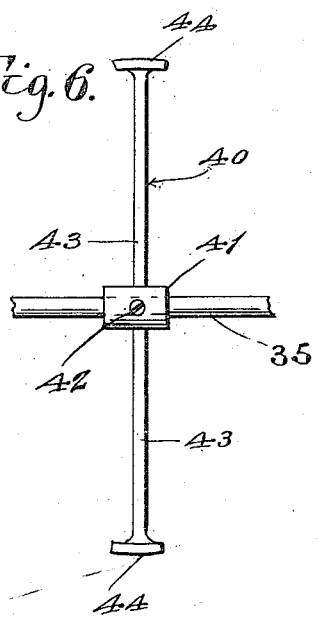
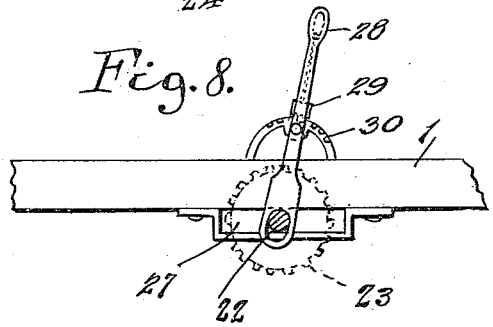
Inventor
H. C. Williams.
Witness:

UNITED STATES PATENT OFFICE.

HENRY C. WILLIAMS, OF RAVINE, MISSISSIPPI.

PEANUT-HARVESTER.

1,267,614.  Specification of Letters Patent.  Patented May 28, 1918.

Application filed August 9, 1916. Serial No. 114,006.

*To all whom it may concern:*

Be it known that I, HENRY C. WILLIAMS, a citizen of the United States, residing at Ravine, in the county of Noxubee and State of Mississippi, have invented certain new and useful Improvements in Peanut-Harvesters; and I do hereby declare the following to be a full, clear, and exact description of the invention, such as will enable others skilled in the art to which it appertains to make and use the same.

This invention relates to a peanut harvester, and the primary object of the invention is to provide in a peanut harvester, a supporting structure which has a plurality of shovels adjustably carried by the forward end of the same for loosening dirt about a row of peanuts, so that it and the peanuts may be easily scooped up by an uprooting scoop carried by the frame rearwardly of the shovels and further to provide means for conveying the peanuts from the uprooting scoop to a suitable receptacle.

A further object of this invention is to provide a plurality of shafts positioned above the peanut conveyer, and rotatable by the rotation of the supporting wheels of the peanut harvester, for beating the peanut plants during their travel upon the conveyer for shaking the dirt from the peanuts and the plant roots and also to provide a guard structure positioned above the rotary beaters for preventing the beaters from throwing the peanut plants outwardly off of the harvester.

A still further object of this invention is to provide an adjustable mounting for one of the shafts which operates the conveyer, whereby the conveyer may be slacked when desired, and shaken for cleaning the same.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved peanut harvester having parts broken away, Fig. 2 is a top plan view of the improved peanut harvester, Fig. 3 is a vertical section through the harvester, Fig. 4 is a detail perspective view of the dirt loosening shovels, Fig. 5 is a fragmentary perspective view of a part of the guard structure of the harvester, Fig. 6 is a detail view of one of the rotary beaters, Fig. 7 is a fragmentary plan of the conveyer, and Fig. 8 is a detail view showing the adjustable mounting of one of the shafts of the conveyer.

Referring more particularly to the drawings, 1 designates the supporting frame of the peanut harvester as an entirety, which has a plurality of supporting axles 2 carried thereby upon which are mounted supporting wheels 3 of the ordinary type.

An auxiliary supporting frame 4 is attached to the front end of the frame 1 in any suitable manner, and it has a substantially U-shaped bar 5 attached thereto and extending forwardly therefrom. A pair of braces 6 and 7 are carried by the auxiliary supporting frame 4. Shovel carrying standards 8 are detachably and adjustably carried by the braces 6 and 7 and the bight portion of the U-shaped bar 5. Shovels 9 are carried by the lower ends of the standards 8, and they are provided for loosening the dirt about a row of peanuts, so that the peanuts may be easily uprooted by the uprooting scoop 10.

The uprooting scoop 10 is pivotally supported by a rod 11, and it has a bail 12 connected to the sides of the same, which bail 12 is in turn connected to a rod 13. The rod 13 has the arm 14 of a pivoted hand lever 15 connected thereto, as clearly shown in Fig. 1 of the drawings. The hand lever 15 is pivotally supported at 16, and it has a dog mechanism 17 carried thereby which coacts with a quadrant 18. The lever 15 is provided for adjusting the elevation of the inserting point 19 of the uprooting scoop 10.

The uprooting scoop 10 delivers the peanuts to a conveyer structure 20 which includes a pair of shafts 21 and 22 positioned at the forward and rear ends respectively of the frame 1. The shafts 21 and 22 have a plurality of sprockets 23 mounted thereon about which chains 24 travel. The chains 24 are positioned in spaced relation to each other laterally of the frame 1 and they have a plurality of buckets or flights 25 carried thereby, which will convey the peanuts rearwardly for deposit in the receptacle 26. The rear shaft 22 extends through slots 27 formed in the supporting frame 1, and it has a lever 28 carried thereby, and pivotally connected to the frame. A dog mechanism 29 of the ordinary construction is carried by the lever 28, and coacts with a quadrant 30 for holding the lever in adjusted positions. The lever 28 is provided for shifting the shaft 22 within the slots 27 so as to permit of the slacking or loosening of the chains 24. The shaft 21 preferably has its outer end which projects beyond the outer edge of the frame 1 rectangularly-shaped as shown at 31, and it is adapted for receiving a crank handle for rotating the shaft for shaking the chains 24 when they are loosened or slacked by the operation of the lever 28 for the purpose of cleaning the chains.

A platform 33 is positioned beneath the upper run of the conveyer structure 20, and it slopes outwardly toward each side, from the center as clearly shown in Fig. 3 of the drawings, so that the dirt shaken from the peanut plants and which falls upon the platform 33 will slide off the sides of the same. A second platform 34 is positioned beneath the lower run of the conveyer 20 and it is provided for preventing the dirt over which the harvester is traveling from interfering with the operation of the said conveyer.

A plurality of shafts 35 are rotatably supported by suitable bearings 36, which extend upwardly from the supporting frame 1. The shafts 35 have sprockets 37 mounted thereon which are operatively connected to sprockets 38 carried by the various axles 2, through the medium of sprocket chains 39, so that the shafts 35 will be rotated by the rotation of the various axles 2. The shafts 35 have a plurality of beaters or shakers 40 connected thereto which comprise collars 41 that are adjustably mounted upon the shafts and held in place through the medium of set screws 42. The collars 41 have arms 43 formed thereupon, the outer ends of which are enlarged as shown at 44. The arms 43 are provided for engaging the peanut plants during their travel with the conveyer structure 20 for the purpose of loosening dirt or other foreign substance which may be clinging to the peanut plant roots, and the peanuts. The bearings 36 have extension bearings 46 carried thereby which removably support a guard structure 47. The guard structure 47 comprises a plurality of rods 48 which extend longitudinally of the harvester, and are positioned higher than the enlarged heads 44 of the beating arms 43 for preventing these arms from throwing the peanut plants off the harvester, in case they become entangled with the plants.

A plurality of transversely extending rods 49 are connected to the longitudinally extending rods 48.

The conveyer structure is driven by one of the shafts 35, through the medium of sprocket chains 50 which pass about sprockets 51 carried by the shaft 35 and about sprockets 52 which are carried by the shaft 22.

The peanut retaining receptacle 26 includes a suitable receptacle which has supporting wheels 54 attached to its ends, and which is connected to the under surface of the bottom of the supporting frame 1 by suitable hooks 55 as clearly shown in Fig. 1 of the drawings.

A seat 56 of the ordinary construction is supported by suitable standards 57, which standards are in turn attached to the supporting structure 1.

In the operation of the improved peanut harvester the dirt about the row of peanuts or analogous agricultural products is loosened by the shovels 9, and the uprooting scoop 10 will uproot the peanuts and a part of the dirt surrounding the peanuts. The forward travel of the harvester will force the peanut plants upwardly over the upper surface of the scoop 10 upon the conveyer structure 20. During the travel of the peanuts with the conveyer structure, they will be engaged by the arms 43, which will be rotated by the shafts 35. The arms 43 will shake the peanut plants and loosen any dirt which might cling to the peanuts. The rod or guard structure 47 will prevent the arms from throwing peanuts off the harvester. The peanuts will be delivered from the conveyer structure 20 to the receiving receptacle 26. When it is desired to clean the chains of the conveyer structure, the lever 28 is actuated for loosening or slacking the chains, and the forward shaft 21 is rotated through the medium of the crank handle for shaking the chains to clean them of dirt.

From the foregoing description taken in connection with the accompanying drawings, the advantages of construction and of the method of operation of the improved peanut harvester will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a harvester structure, the combination of a supporting frame, uprooting means carried by said supporting frame, a plurality of axles rotatably supported by said frame, supporting wheels mounted upon said axles, a conveyer positioned for receiving articles from said uprooting means, means for operating said conveyer by the rotation of one of said axles, a plurality of shafts rotatably supported above said conveyer, a plurality of radiating arms carried by each of said shafts, and means operatively connecting said shafts to said axles for rotating the shafts for rotating said radiating arms above said conveyer.

2. In a harvester structure, the combination of a supporting frame, uprooting means carried by said supporting frame, a plurality of axles rotatably supported by said frame, supporting wheels mounted upon said axles, a conveyer positioned for receiving articles from said uprooting means, means for operating said conveyer by the rotation of one of said axles, a plurality of shafts rotatably supported above said conveyer, a plurality of radiating arms carried by each of said shafts, means operatively connecting said shafts to said axles for rotating the shafts for rotating said radiating arms above said conveyer, a guard structure positioned above said shafts and comprising a plurality of longitudinally and transversely extending rods.

3. In a harvester structure, the combination of a supporting structure, an endless conveyer carried by said supporting structure, a plurality of shafts rotatably supported above said conveyer, means for rotating said shafts, a plurality of radiating arms carried by said shafts, the outer ends of said arms being enlarged for beating agricultural products being conveyed by said conveyer, a guard structure positioned higher than said shaft and arms and comprising a plurality of longitudinally and laterally extending rods, said longitudinally extending rods having their ends bent downwardly for preventing said arms from throwing agricultural products off the ends of said harvester.

4. In a harvester structure, the combination, of a supporting structure, an endless conveyer carried by said supporting structure, a plurality of shafts rotatably supported above said conveyer, means for rotating said shafts, a plurality of radiating arms carried by said shafts, the outer ends of said arms being enlarged for beating agricultural products being conveyed by said conveyer, a guard structure positioned higher than said shafts and arms and comprising a plurality of longitudinally and laterally extending rods, said longitudinally extending rods having their ends bent downwardly for preventing said arms from throwing agricultural products off the ends of said harvester, and a platform positioned beneath said conveyer for guarding the conveyer from interference by the dirt over which the harvester is traveling.

In testimony whereof I affix my signature in presence of two witnesses.

HENRY C. WILLIAMS.

Witnesses:
W. O. BARNES, Jr.,
JNO. A. TYSON, Jr.

Copies of this patent may be obtained for five cents each, by addressing the "Commissioner of Patents, Washington, D. C."